Patented Aug. 30, 1932

1,875,200

UNITED STATES PATENT OFFICE

JULIUS SÖLL, OF FRANKFORT-ON-THE-MAIN-SCHWANHEIM, GERMANY, ASSIGNOR TO I. G. FARBENINDUSTRIE AKTIENGESELLSCHAFT, OF FRANKFORT-ON-THE-MAIN, GERMANY

PROCESS OF PREPARING HYDROFLUORIC ACID POOR IN SILICIC ACID

No Drawing. Application filed December 30, 1930, Serial No. 505,663, and in Germany July 14, 1927.

The present invention relates to a process of preparing hydrofluoric acid poor in silicic acid.

In the technical preparation of hydrofluoric acid it is generally of importance to obtain a hydrofluoric acid having as low a content as possible of fluosilicic acid. One starts therefore generally from a fluorite which to a great extent is free from silicic acid. Such a fluorite is, however, very expensive on account of its rare occurrence. It is, therefore, of a great industrial value to prepare a hydrofluoric acid poor in silicic acid from a fluorite containing a large quantity of silicic acid.

In the usual method of mixing fluorite with almost concentrated sulfuric acid a small quantity of silicon fluoride escapes as long as the magma is still thinly liquid. As the magma solidifies after a short time it is impossible by this method to expel considerable quantities of the silicic acid as silicon fluoride; such process would require a heating and stirring of several hours of the magma on account of the small capability of reacting of the silicic acid admixed to the fluorite.

I have now found that the onerous setting of the magma containing fluorite and sulfuric acid can be prevented by using the sulfuric acid not in the usual concentration of 92-95 per cent, but with a slightly increased content of water. When using an acid the concentration of which—according to the nature of the fluorite used—is, for instance, between 70 per cent and 90 per cent, a magma is obtained which is still sufficiently soft even after it has been heated for hours to a temperature suitable for eliminating the silicon fluoride, for instance 70° C.-120° C. This is likewise the case if no excess of sulfuric acid is used. The magma solidifies only, due to the formation of gypsum, if the temperature is raised to such a degree as causes hydrofluoric acid to escape. The concentration of sulfuric acid may be further decreased; some drawbacks, however, then take place.

Based upon this newly gained knowledge, the present process is carried out as follows:

The fluorite is mixed with a certain quantity of sulfuric acid (or with an excess of sulfuric acid) of a suitable concentration between 70 per cent and 90 per cent, for instance 88 per cent of $H_2SO_4$, so as to form a magma and the magma is heated for several hours to such a temperature (70° C.-120° C.) that there occurs a weak formation of hydrofluoric acid which suffices for eliminating the silicic acid as $SiF_4$. The concentration of the sulfuric acid and the temperature have to be adapted to the nature varying according to the origin of the fluorite used. As the hydrofluoric acid is considerably more soluble in sulfuric acid of the said concentration at the temperature mentioned above than silicon fluoride, silicon fluoride escapes first. If temperatures exceeding 120° C. are applied, hydrogen fluoride finally goes over with silicon fluoride; the hydrogen fluoride can be retained by a reflux condenser. The silicon fluoride which has been eliminated is suitably collected alone in a condenser. As soon as the delivery of silicon fluoride is complete, the magma of fluorite and sulfuric acid is completely decomposed by raising the temperature either in the same apparatus after having changed it into a condenser for hydrofluoric acid or the magma may be passed into a second device, for instance, into an automatically working calcining furnace wherein the evolution of hydrofluoric acid is carried out. If it is desired to obtain a hydrofluoric acid which is as anhydrous as possible, the concentration may be raised as near as desired to 100 per cent by the addition of a corresponding part of fuming sulfuric acid. Fluorite and sulfuric acid may likewise be mixed to a magma by using a small quantity of sulfuric acid (for instance 50 per cent of the quantity required for the complete decomposition of the fluorite). The rest of sulfuric acid (if desired in concentrated form or as fuming sulfuric acid) may be added during the elimination of the silicon fluoride or before the magma is conducted into the generator for hydrofluoric acid.

By the present process it is possible to obtain a hydrofluoric acid relatively poor in silicic acid besides fluosilicic acid by starting from fluorites very rich in silicic acid as they are obtainable everywhere at a very low price. By the SiO$_2$-content of this hydrofluoric acid disturbances are avoided when the acid is worked up. A previous expensive purification of the fluorite can be dispensed with.

I claim:

1. A process of preparing hydrofluoric acid poor in silicic acid, which comprises mixing a fluorite with sulfuric acid of a concentration of between 70% to 90%, heating the mixture while stirring to a temperature of from 90° to 120° C., until formation of silicon fluoride has ceased, and then distilling off hydrofluoric acid by heating the mixture to a temperature of above 120° C.

2. A process of preparing hydrofluoric acid poor in silicic acid, which comprises mixing a fluorite with sulfuric acid of a concentration of between 70% to 90%, heating the mixture while stirring to a temperature of from 90° to 120° C., until formation of silicon fluoride has ceased, adding fuming sulfuric acid to the mixture, and distilling off hydrofluoric acid from the mixture at a temperature of above 120° C.

3. A process of preparing hydrofluoric acid poor in silicic acid, which comprises mixing a fluorite with sulfuric acid of a concentration of between 70% to 90%, heating the mixture while stirring to a temperature of from 90° to 120° C., until formation of silicon fluoride has ceased, transferring the mixture into another reaction vessel and distilling off the hydrofluoric acid from the mixture at a temperature above 120° C.

4. A process of preparing hydrofluoric acid poor in silicic acid, which comprises mixing a fluorite with sulfuric acid of a concentration of between 70% to 90%, heating the mixture while stirring to a temperature of from 90° to 120° C., until formation of silicon fluoride has ceased, then transferring the mixture into another reaction vessel and adding to the mixture fuming sulfuric acid and distilling off the hydrofluoric acid at a temperature of above 120° C.

5. A process of preparing hydrofluoric acid poor in silicic acid, which comprises mixing a fluorite with sulfuric acid of a concentration of 85% and heating while stirring the mixture at a temperature of about 100° C., until formation of silicon fluoride has ceased, and then distilling off hydrofluoric acid from the mixture at a temperature of about 250° C.

6. A process of preparing hydrofluoric acid poor in silicic acid, which comprises mixing a fluorite with sulfuric acid of a concentration of 85%, heating the mixture while stirring to a temperature of about 100° C., until formation of silicon fluoride has ceased, adding fuming sulfuric acid to the mixture, and distilling off hydrofluoric acid from the mixture at a temperature of about 250° C.

7. A process of preparing hydrofluoric acid poor in silicic acid, which comprises mixing a fluorite with sulfuric acid of a concentration of 85%, heating the mixture while stirring to a temperature of about 100° C., until formation of silicon fluoride has ceased, transferring the mixture into another reaction vessel and distilling off the hydrofluoric acid from the mixture at a temperature about 250° C.

8. A process of preparing hydrofluoric acid poor in silicic acid, which comprises mixing a fluorite with sulfuric acid of a concentration of 85%, heating the mixture while stirring to a temperature of about 100° C., until formation of silicon fluoride has ceased, transferring the mixture into another reaction vessel, adding to the mixture fuming sulfuric acid and distilling off the hydrofluoric acid at a temperature of about 250° C.

In testimony whereof, I affix my signature.

JULIUS SÖLL.